US011360858B2

United States Patent
Tiwari et al.

(10) Patent No.: US 11,360,858 B2
(45) Date of Patent: Jun. 14, 2022

(54) METHOD AND APPROACH FOR PAGINATION OVER DATA STREAM WITH SLIDING WINDOW

(71) Applicant: EMC IP Holding Company LLC, Hopkinton, MA (US)

(72) Inventors: Priyank Tiwari, Bangalore (IN); Hari Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 44 days.

(21) Appl. No.: 16/951,575

(22) Filed: Nov. 18, 2020

(65) Prior Publication Data

US 2021/0081283 A1    Mar. 18, 2021

Related U.S. Application Data

(63) Continuation of application No. 15/990,326, filed on May 25, 2018, now Pat. No. 10,860,435.

(51) Int. Cl.
*G06F 17/00* (2019.01)
*G06F 11/14* (2006.01)
*H04L 67/568* (2022.01)
*H04L 67/01* (2022.01)

(52) U.S. Cl.
CPC ...... *G06F 11/1464* (2013.01); *H04L 67/2842* (2013.01); *G06F 2201/80* (2013.01); *H04L 67/42* (2013.01)

(58) Field of Classification Search
CPC .. G06F 11/1464; G06F 11/1458; G06F 11/14; G06F 11/69; G06F 2201/80; G06F 2201/83; H04L 67/2842; H04L 67/42; H04L 67/1097; H04L 67/1002
See application file for complete search history.

(56) References Cited

U.S. PATENT DOCUMENTS

| 8,214,428 | B1 | 7/2012 | Christiaens |
| 10,860,435 | B2 * | 12/2020 | Tiwari ............... H04L 67/2842 |
| 2007/0250671 | A1 | 10/2007 | Lyon |

(Continued)

OTHER PUBLICATIONS

N. Ahmed, M. Linderman and J. Bryant, "Towards Mobile Data Streaming in Service Oriented Architecture," 2010 29th IEEE Symposium on Reliable Distributed Systems, 2010, pp. 323-327, Oct. 2010.*

(Continued)

*Primary Examiner* — Greta L Robinson
(74) *Attorney, Agent, or Firm* — Workman Nydegger

(57) ABSTRACT

An example method includes receiving, at a server, a request for a list of a first group of index records that correspond to stored data, creating a data streaming session with a client, reading an index file and obtaining a list of the first group of index records from the index file, populating a content cache with a signature that corresponds to the first group of index records, creating a sliding window and populating it with the signature and a pointer to a next group of index records, populating an attribute cache with data streaming session information and the sliding window, creating a continuation token which, when received by the server from the client, indicates to the server that the list of the first group of index records has been received by the client.

18 Claims, 5 Drawing Sheets

(56) References Cited

U.S. PATENT DOCUMENTS

2014/0013057 A1* 1/2014 Agrawal ............ G06F 12/0875
                                                            711/126
2014/0019454 A1  1/2014 Carter et al.
2014/0123173 A1  5/2014 Mak et al.
2017/0249373 A1  8/2017 Dhananjay

OTHER PUBLICATIONS

Y. Aun, S. Manickam and S. Karuppayah, "A temporal-aware signature extraction method using sliding-window mechanism for scalable, cost-effective and accurate traffic classification," 2017 7th IEEE International Conference on Control System, Computing and Engineering (ICCSCE), pp. 156-161, Nov. 2017.*

* cited by examiner

METHOD AND APPROACH FOR PAGINATION OVER DATA STREAM WITH SLIDING WINDOW

FIELD OF THE INVENTION

Embodiments of the present invention generally relate to restore operations involving a client and a server. More particularly, at least some embodiments of the invention relate to systems, hardware, software, computer-readable media, and methods directed to establishing and maintaining a consistent pagination state with respect to one or more data streams passing between a client and a server.

BACKGROUND

Many legacy applications provide Representational State Transfer (REST) based interfaces for their operations so that those applications can operate in cloud storage ecosystems. The stateless RESTful architecture helps applications to scale and provides de-facto standards to communicate with micro-services. This adaptation by a legacy application may involve identification of resources and performance of various operations with respect to those resources. One example of a commonly employed operation, or "verb" is GET, which may be used to retrieve data records.

The GET operation, or requests, may be employed by applications that use REST-based interfaces. Particularly, the GET request enables an application to request and receive a stream of data records. In at least some circumstances and applications, the GET requests must be idempotent. That is, the GET requests must be the same each time and must not change the resource, such as a database or index for example, to which the GET requests are directed. However, the REST Application Program Interface (API) presents challenges in this regard inasmuch as it is not able to fulfill idempotent GET requests.

In more detail, conventional approaches may employ a memory map that includes various pointers, such that succeeding GET requests cause the pointer to be moved to the next group of files, for example. However, the previous "old" pointer is then lost, such that later requests for the prior information that was transmitted to the requestor cannot be fulfilled because the pointer is gone. Moreover, the server that is tasked with fulfilling the GET requests lacks awareness as to whether the requesting client has received the older records or not. Thus, there may be an inconsistent state of paginated output in the client with respect to the server.

In light of problems such as those noted above, there is a need for a mechanism that will help to ensure that the client does not receive the same set of old records when using idempotent GET requests. Moreover, the mechanism should be compatible with REST APIs that are employed by many legacy applications. Finally, the mechanism should enable establishment and maintenance of a consistent pagination state between a client and a server to which client requests are directed.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
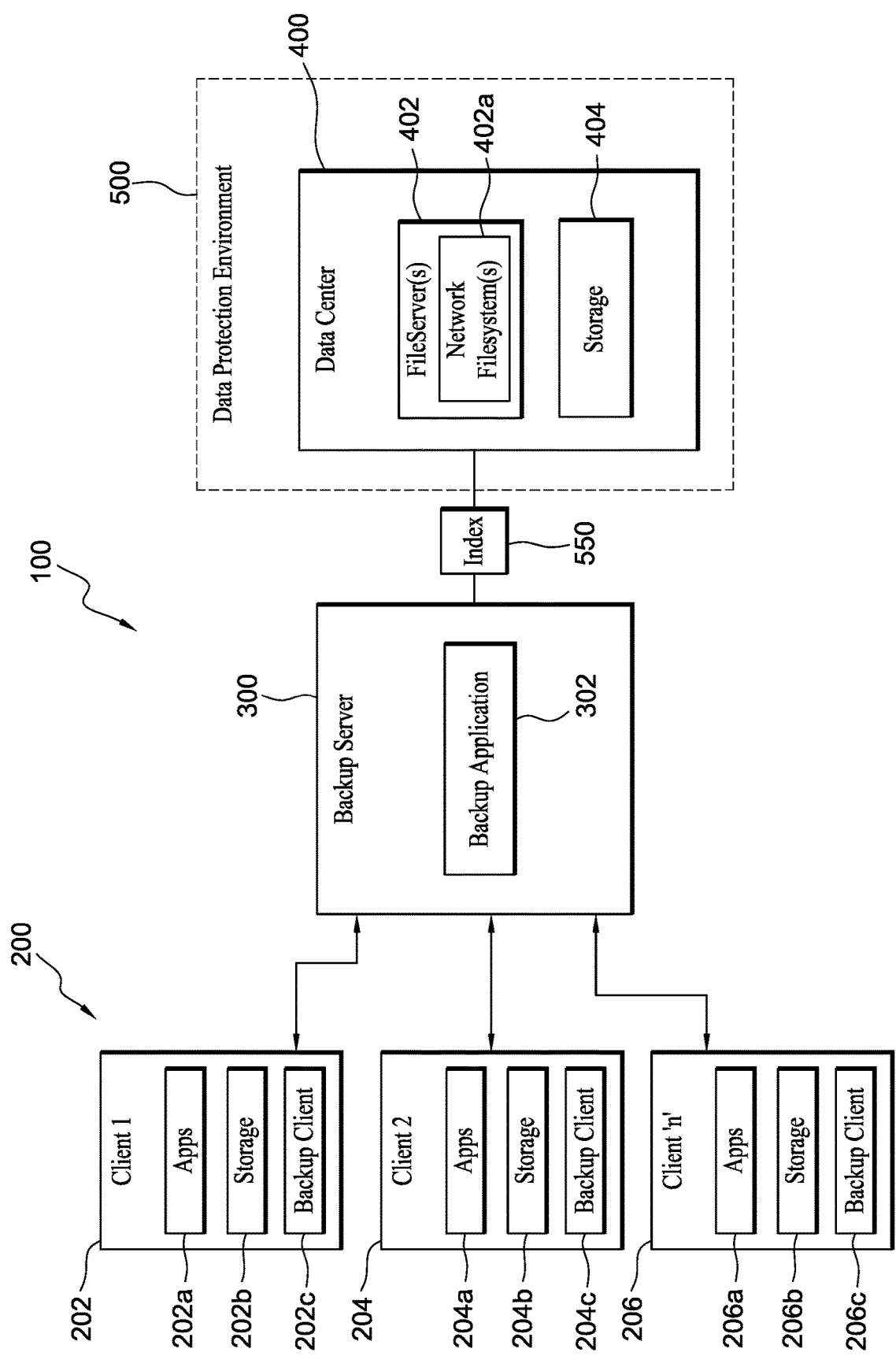
FIG. 1 discloses aspects of an example operating environment which may take the form of a data protection environment.

Embodiments of the present invention generally relate to restore operations involving a client and a server. More particularly, at least some embodiments of the invention relate to systems, hardware, software, computer-readable media, and methods directed to establishing and maintaining a consistent pagination state with respect to one or more data streams passing between a client and a server. At least some embodiments of the invention may be particularly well suited for use with various legacy applications.

One non-limiting example of such a legacy application is an application which provides primarily a backup/recover functionality to a wide variety of filesystems and applications. The backup/recover application may be based on a client-server model in which one or more clients send data to a data protection system, such as a storage system, for backup. In connection with performance of the backup processes, metadata of the data to be backed up is generated. This metadata is kept in a backup/recover server to facilitate recovery functionality when the backed up data is to be recovered and restored to one or more target entities, such as a client or clients for example. A variety of different types of metadata may be stored. One example is "layout of data in backup." This metadata is not stored in a structured database, but is written in per-client-files which may be referred to herein as index-records.

Whenever a client needs to recover a particular file/fileset, the client then issues a GET request to read the corresponding index-records files from the backup/recover server. The backup/recover server, in turn, spawns a process which streams the records from the server to the client. A single client may have many sessions to read the same index-records, such that there may be multiple IndexD processes, which map index-records to the spawned process memory. Typically, this functionality has not been implemented with a structured-database due to the sheer volume of transactions and operations, as well as the requirement to support many legacy client applications.

As noted, embodiments of the invention can be employed in connection with a variety of applications. One example is the legacy EMC Networker Data Protection Application ("NetWorker"). Thus, the client mentioned in the preceding discussion may, but need not, comprise a NetWorker client, and the server mentioned in the preceding discussion may, but need not, comprise a NetWorker REST server. Correspondingly, the process spawned by the backup/recover server may, but need not, be an "IndexD" process.

As should be apparent, index records may contain millions of entries. Thus, the resources in REST must be able to support idempotent GET operations over streamed data fetched by legacy applications. Thus, in at least some embodiments of the invention, a REST server, which may be a NetWorker server for example, caches the index-records over a stream of data and maintains the client session request. The server returns a "Continuation Token" (CT) which encompasses the session to IndexD and the "next entry" in data stream. The continuation token may be encrypted, although that is not required. In this way, the client and server are in a consistent state, relative to each other, with regard the paginated output from the server to the client.

In more detail, the server may maintain a cache of at least the last set of records that were returned to the client in response to a GET request by the client. The application client may expect the server to preserve not only the last set of records provided to the client but to also preserve a certain number of record sets to show paginated output in a user interface (UI) of the client. Thus, example embodiments employ a sliding window that is based on pagination of a data stream, where a paginated record is kept in the server cache. The sliding window will have an array of references to the server cache. If multiple GET requests from multiple different clients arrive at the server for the same set of records, then the cache entries reference count at the server will increase. As well, the eviction of records from the server cache is based on the sliding window entries in per-client sessions as well as a reference count of the cache entries. The following example provides a brief illustration of aspects of an example embodiment.

Embodiments of the invention may involve the use of a continuation token (CT) that is employed by a client to fetch a next set of records. Thus, for example, the client may issue a GET request and in response to the GET request, the server returns list of index records along with continuation token X' in an HTTP header. The client can then send the same continuation token X' in another GET request to the server, and the server will return the next set of entries along with a new continuation token X". Thus, the client is able to issue idempotent GET requests to obtain the necessary data while, at the same time, the server is able to keep track of which information has already been sent to the client. Thus, a consistent state of pagination of a data stream passing between the client and server is established and maintained as between the client and the server.

Advantageously then, a consistent state of pagination of a datastream can be maintained between a client and server, where the client is running one or more legacy applications that may require the use of a REST API. Further, embodiments of the invention are consistent with, and support, the use of idempotent GET requests from one or more clients, operating legacy applications, to a server, even in cases where index records containing millions of entries are involved. Thus, the effectiveness and efficiency of server operations and client operations, such as relating to backup and restore operations, are improved since the server has an awareness of what records have been sent to the client, thereby avoiding situations in which the wrong records, duplicate records, and/or incomplete records, are sent to the client. Moreover, the server can also accommodate circumstances where a requesting client crashes. As a final example, embodiments of the invention may be employed in connection with data that is stored in unstructured backup databases. These and other aspects of the disclosed processes and methods are discussed below in connection with various illustrative examples.

A. Aspects of An Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in an operating environment that includes a data protection environment, which may include one or more storage systems including primary storage and data protection storage. In some specific example embodiments of the invention, at least some functionality may be provided by, or implemented in connection with, a platform such as the NetWorker data protection platform, and associated systems, methods, and components, although use of this particular platform is provided only by way of illustration and is not required.

The data protection environment may take the form of a cloud storage environment, an on-premises storage environment, and hybrid storage environments that include public and private elements, although the scope of the invention extends to any other type of data protection environment as well. Any of these example data protection environments, may be partly, or completely, virtualized.

In addition to the data protection environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, database applications such as SQL Server, filesystems, as well as datastores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular reference now to FIG. 1, an example operating environment 100 may include a plurality of clients 200, such as clients 202, 204 and 206. Each of the clients 200 may host one or more applications 202a, 204a and 206a, respectively, that create new and/or modified data that is desired to be protected. As such, the clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components.

As well, each of the clients 200 may include respective local storage 202b, 204b and 206b. The local storage 202b, 204b and 206b can be used to store data, which may be backed up as described below. The backup data can be restored to local storage 202b, 204b and 206b. The clients 200 may each also include a respective backup client application 202c, 204c and 206c.

With continued reference to FIG. 1, the example operating environment may further include a backup server 300 that includes a backup application 302. The backup application 302 may cooperate with one or more of the backup clients 202c, 204c, or 206c to backup client 202, 204 and 206 data at a datacenter 400 of a data protection environment 500. The backup application 302 may also cooperate with one or more of the backup clients 202c, 204c, or 206c to restore backed up client 202, 204 and 206 data from the datacenter 400 to the clients 202, 204 and 206. In some embodiments, the backup server 300 may be an EMC Corp. NetWorker server, although no particular server is required for embodiments of the invention.

As indicated, the data protection environment 500, may comprise or consist of datacenter 400, which may be a cloud storage datacenter in some embodiments, that includes one or more network fileservers 402 that are accessible, either directly or indirectly, by the clients 200. Each of the network fileservers 402 can include one or more corresponding network filesystems 402a, and/or portions thereof.

The datacenter 400 may include and/or have access to storage 404, such as a data storage array for example, that communicates with the network filesystems 402a. In general, the storage 404 is configured to store client 200 data backups that can be restored to the clients 200 in the event that a loss of data or other problem occurs with respect to the clients 200. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated.

The storage 404 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage 404 can use Hard Disk Drive (HDD) storage for throughput intensive workloads that are typically measured in terms of data transfer rates such as MB/s.

Finally, the example operating environment 100 may include an index 550 that stores index-records of data, where the data may take the form of files or filesets or any other form disclosed herein, that has been stored in the data protection environment 500. The index 550 may take the form of an unstructured database, although other index 550 configurations may alternatively be used. The index 550 may comprise an element of the data protection environment 500, or may be an element of the backup server 300. Alternatively, and as indicated in FIG. 1, the index 550 may comprise a separate element that communicates with the backup server 300 and one or more elements of the data protection environment 500, such as the datacenter 400 for example.

B. Example Host and Server Configurations

Figure 2:
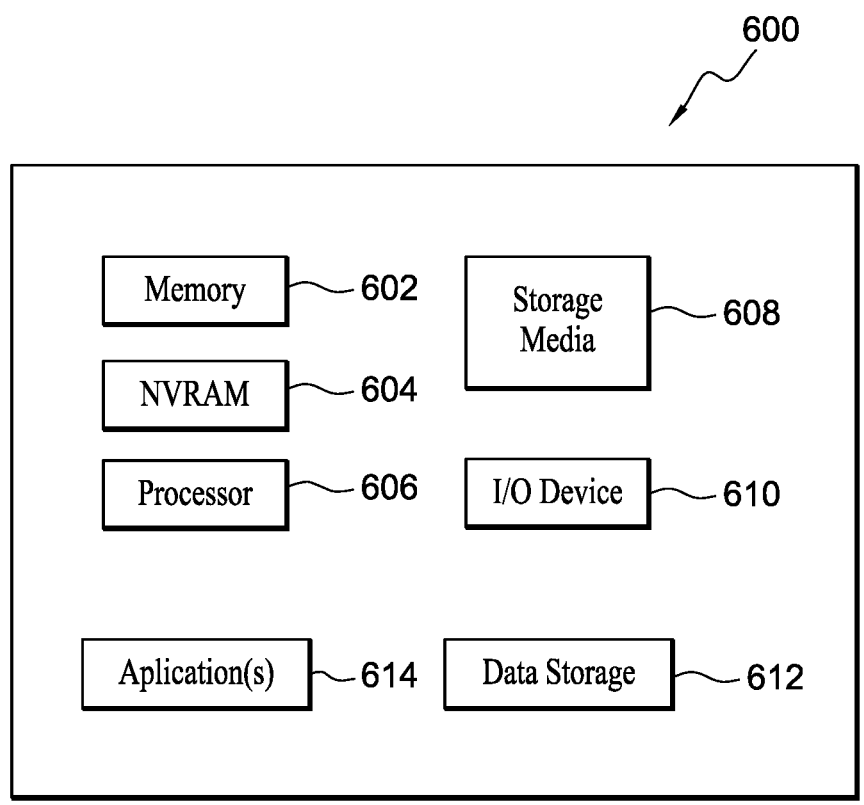
FIG. 2 discloses aspects of an example host configuration.

Turning now to FIG. 2, one or more of the clients 200 and its components, and fileserver 302 and its components, can take the form of a physical computing device, one example of which is denoted at 600. As well, where any of the aforementioned elements comprise or consist of a VM, that VM may constitute a virtualization of any combination of the physical components disclosed in FIG. 3.

In the example of FIG. 2, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, I/O device 610, and data storage 612. One or more of the memory components of the physical computing device can take the form of solid state device (SSD) storage. As well, one or more applications 614 are provided that comprise executable instructions. Such executable instructions can take various forms including, for example, a commonality engine.

C. General Aspects of Some Client-Server-Index Operations

Figure 3:
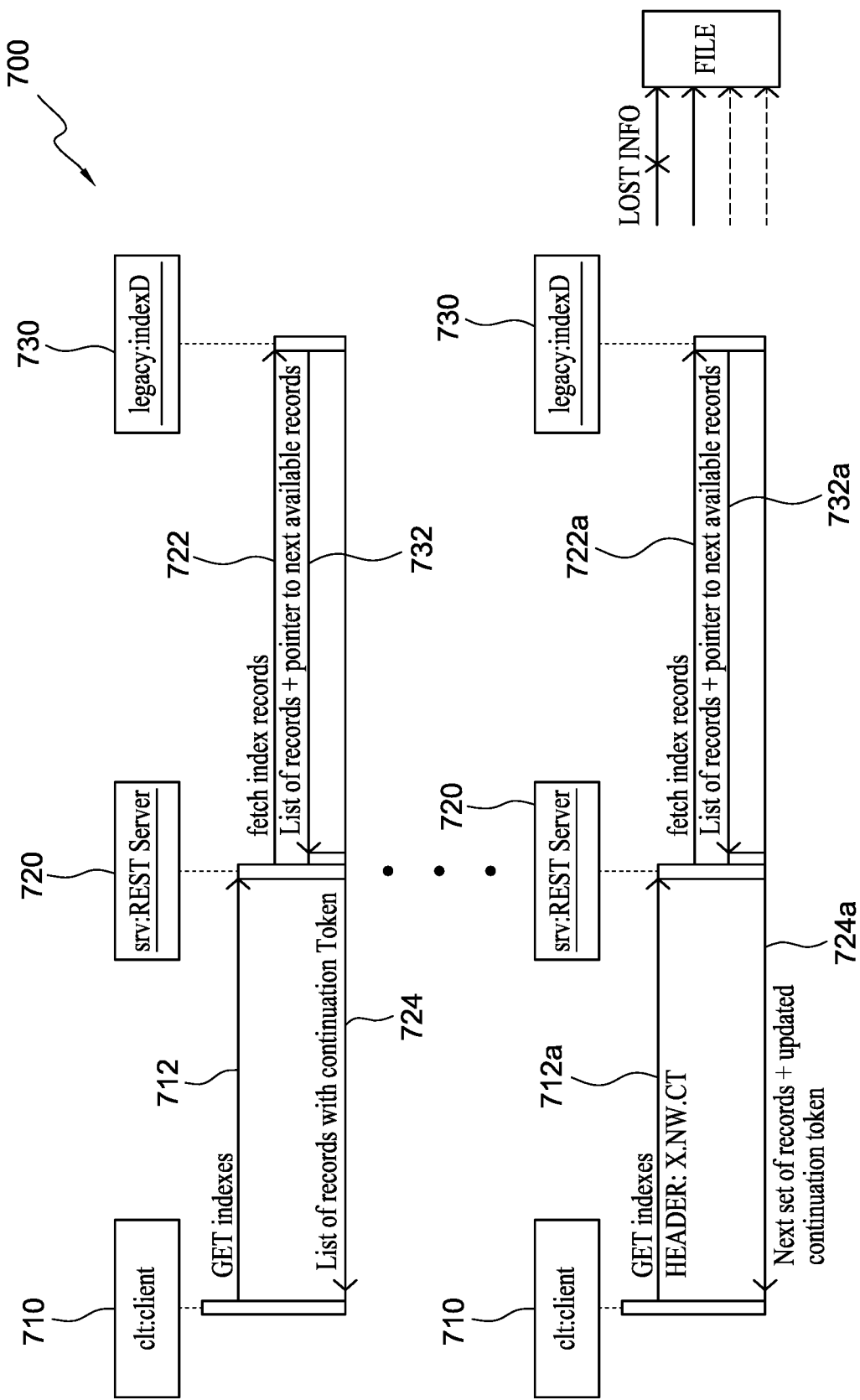
FIG. 3 discloses some basic aspects of a client-server-index configuration.

With attention now to FIG. 3, embodiments of the invention may involve a system configuration 700 that includes one or more clients 710, one or more servers 720, and one or more indexes 730. The client 710 can be any client that transmits a request to recover stored data. The server 720 can be any server that facilitates a data backup and recovery process. The index 730 can be any unstructured database that stores index information concerning client 710 data that has been backed up, such as at a datacenter for example. In other embodiments, the index 730 comprises an element of the server 720 and is responsive to requests sent from the client 710 to the server 720. As noted earlier, the index information may take the form of metadata that facilitates the recovery of backed up data. Thus, the metadata may comprise information such as "layout of data in backup" that indicates how the backed up data is organized. In this case, the metadata is not stored in a database but is written on the server 720 in per-client files referred to herein as index records.

In brief, and with more particular reference now to FIG. 3, the client 710 may issue one or more idempotent GET requests 712 to the server 720. The GET request(s) 712 identify the backed up data that the client 710 wants to be restored. The GET request 712 may be one of many GET requests issued by the client 710 to obtain particular backed up data. As such, the GET request(s) 712 may be collectively associated with a single data stream from the server 720 to the client 710. That is, transmission of a single data stream from the server 720 to the client 710 may involve the use of one or more GET requests 712 from the client 710.

In response to the GET request 712, the server 720 performs a fetch process 722 in which the server 720 accesses the index 730 and obtains the index records that correspond to the data identified in the GET request 712. The index 730 returns a list 732 of the corresponding index records, and the index 730 also returns a pointer to the next group of available records. After receipt of the list 732 and pointer, the server 720 then transmits the list of records 732 and a continuation token 724 to the requesting client 710.

Thus, the server 720, which may be a REST Networker server, caches the index records for a data stream, and also services the client session requests. The continuation token returned by the server 720 comprises a combination of the session to IndexD and the "next entry" in the data stream. In general, the client 710 can use the continuation token to fetch the next set of records. To illustrate, the client 710 may issue the GET request 712 and the server 720 returns list of index records 724 along with continuation token X' (not shown in FIG. 3) in an HTTP header.

To obtain the next group of available records, the client 710 will send the same continuation token X' along with, or as part of, a GET request 712*a* to the server 720 and the server 720, operating in the same manner as with respect to the first group of records, will then request index records 722*a*, receiving the list of records 732*a* along with a pointer to the next available records, and then return the next set of entries 724*a* along with a new, or updated, continuation token X" (not shown in FIG. 3). The header of this subsequent GET request 712*a* may have the form X.NW.CT. This process can be performed repeatedly until all the requested data has been streamed by the server 720 to the client 710.

D. Aspects of An Example System Architecture

Figure 4:
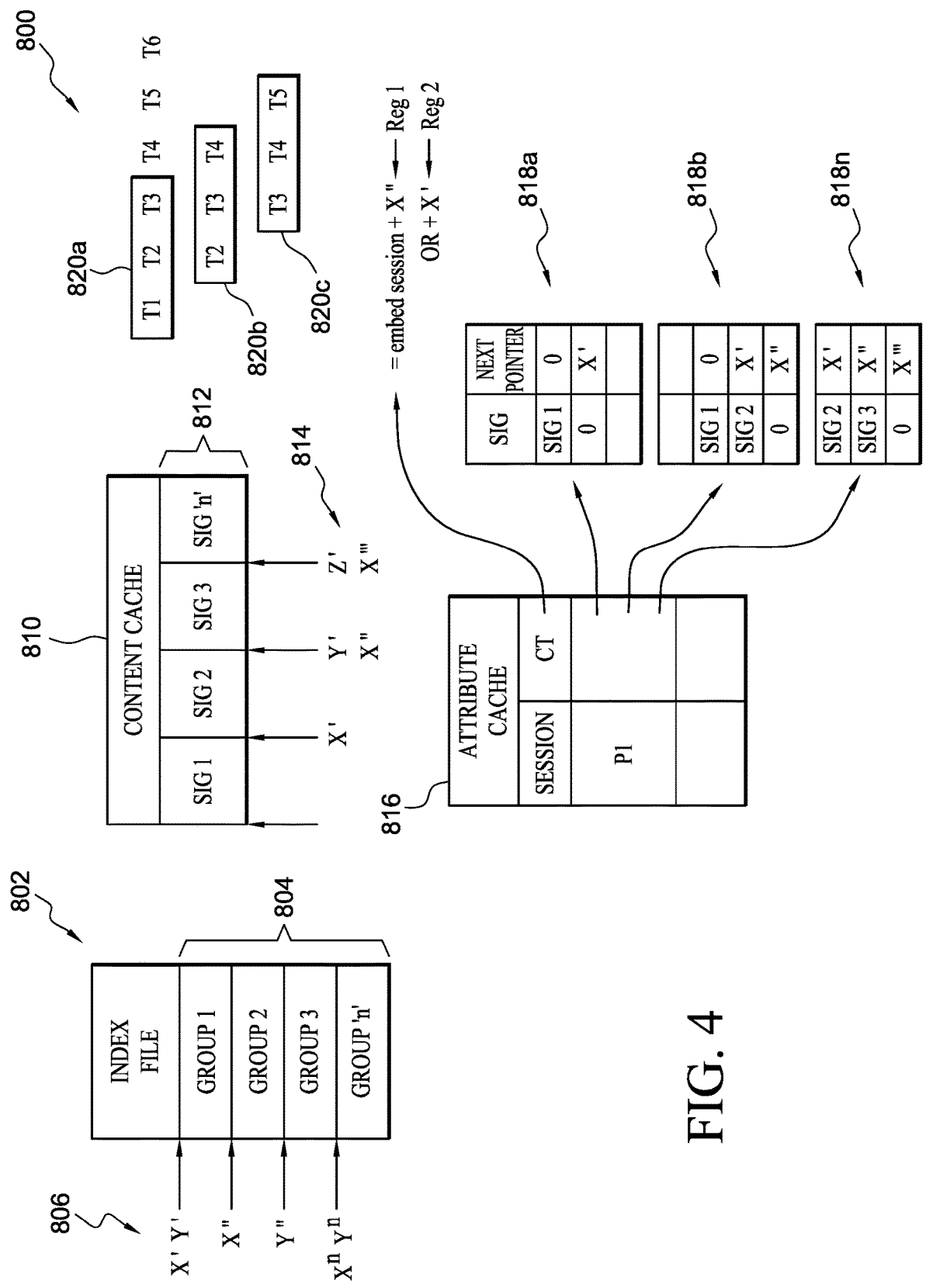
FIG. 4 discloses aspects of an example system architecture.

With continued attention to FIG. 3, and directing attention now to FIG. 4 as well, details are provided concerning aspects of a system architecture, one example of which is denoted generally at 800. The system architecture 800 may include an index file 802, which can take the form of an external data representation (XDR) file for example, although any other suitable file format can alternatively be used. As used herein, XDR refers to a form of coding. The index 730 (FIG. 3) may take the form of an index file such as index file 802. The server 720 may include a daemon which can read the XDR file.

As shown, the index file 802 includes one or more groups of records 804, each of which may correspond to a dataset. That is, one of the groups of records 804 may, for example, comprise an entire file, or only part of a file. As another example, a group of records 804 may comprise multiple files. In any case, the groups of records 804 may include one or more pointers 806. In general, a pointer 806 indicates the start of the next set or group of records 804. Thus, a respective pointer 806 is indicated at the start of Group 1, Group 2, Group 3 and Group 'n.' The pointer X'Y' indicates that that pointer is a pointer for two different processes, namely, process X and process Y, wherein each process corresponds to a particular data stream from a server to a client. On the other hand, the pointer X" is the next pointer, after pointer X', for the same process X. Similarly, the pointer Y" is the next pointer, after pointer Y', for the same process Y. Finally, the pointer X'''Y''' indicates that any number of processes 'n,' and any number of pointers 'n,' can be employed.

With continued reference to FIG. 4, the example system architecture 800 may further include a content cache 810. Both the content cache 810 and the index file 802 may reside at a server, such as the server 720 for example (see FIG. 3), although that particular arrangement is not necessarily required, and the content cache 810 and/or index file 802 may reside elsewhere. As shown in FIG. 4, the content cache 810, which comprises a cache of index records, may include one or more record fingerprints Sig1, Sig2, Sig3, and Sig'n' 812. In some embodiments, the content cache 810 comprises a global Least Recently Used (LRU) cache, although that is not necessarily required, and other cache configurations can alternatively be employed. The content cache 810 keeps a list of the index records for all of the incoming requests.

In general, the fingerprints 812 may comprise any identifier that uniquely identifies a corresponding record 804 or group of records 804. The fingerprints 812 may be derived from, or otherwise based upon, the content of the corresponding record 804 or group of records, although that is not required. For example, a fingerprint 812 may comprise a hash of part, or all, of the corresponding record(s) 804. As further indicated in FIG. 4, one or more pointers 814 may be employed that indicate the start of the next fingerprint 812. In the particular illustrated example, pointers X', Y', X", Z' and X''' are provided. As such, this group of pointers 814 generally implies processes X, Y and Z that each correspond to a respective data stream from a server to a client. It can further be seen that some of the pointers 814 serve as pointers for multiple processes, namely, pointer Y'Z" 814 and pointer Z'X''' 814.

In addition to the content cache 810, the example system architecture 800 may further include an attribute cache 816. The attribute cache 816, which may also be referred to as a concurrent map, may reside at a server, such as server 720 for example, or alternatively may reside elsewhere. Among other things, the attribute cache 816 maintains a session with an application, such as a legacy application, and the sliding window of a continuation token. Thus, the attribute cache 816 provides a mapping of a particular client session that is maintained at the server 720, such as client session P1 for example, along with one or more corresponding continuation tokens (CT), to content in the content cache 810. Some example continuation tokens are illustrated at 818*a*, 818*b*, and 818*n*. As shown, the general format of a continuation token 818 may take the form {SigX, next pointer}. Thus, the continuation token indicates the identity of the next fingerprint 812 and the identity of the pointer 806 that corresponds to that fingerprint 812. FIG. 4 indicates a sequence of continuation tokens that each correspond to a respective request(client)/response(server) pair.

F. Aspects of An Example Sliding Window

With continued reference to FIG. 4, and particularly to the sequence of continuation tokens 818*a*, 818*b*, and 818*n*, it was noted earlier herein that in response to a GET request from a client, a server may return a list of index records along with a continuation token X', which the client can then send to the server with another GET request in order to receive the next set of index records along with a new continuation token X". However, a situation could occur where, for example, the issues the continuation token X", but for some reason the continuation token X" never reached the client, possibly because of a network issue, or because the client crashed after receiving the continuation token X". In this circumstance, if the client were to re-issue the continuation token X' to the server in order to restart the data stream, the server, which is unaware of the loss of the continuation token X" by the client, would be unable to return the index records corresponding to X'. Instead, as far as the server is aware, the next set of records to send to the client would be the records associated with the pointer of continuation token X". Thus, the server and client would be in an inconsistent state with respect to the data stream from the server to the client. That is, the restarted client would be expecting to receive the records associated with continuation token X', but the server would be expecting to send the records associated with continuation token X".

To address situations such as this, the server maintains a separate queue of a specified size for the continuation token. This queue may be referred to herein as a sliding window (or SW). Once this queue is full, then the oldest entry will be evicted from this queue. In general, each sliding window data structure is in the form of a tuple: {next pointer for stream data, fingerprint of last stream data which is placed in cache (at server)}. The example continuation tokens 818a, 818b, and 818n are illustrative, and are assumed to all relate to a single process although, as noted elsewhere herein, embodiments of the invention can be implemented in connection with multiple processes, as implied by the different pointers X" and Y" in FIG. 4.

With reference first to the continuation token 818a, the first GET request to fetch index records has two sliding window entries, namely, {(0, sig1), (X', 0)}, where each of the tuples comprises a respective continuation token. The "0" value of the first tuple signifies a new request which has no previous next pointer to the data stream. Thus, a new index-records streaming process, such as IndexD for example, is created by the server, such as server 720, to get a list of index records associated with the client GET request. This process is indicated by the session ID of 'P1,' and the continuation tokens 818a, 818b, and 818n are all employed in connection with session P1.

The "sig1" value of the first tuple is a signature of fetched content that corresponds to the retrieved index records and has been placed in cache at the server. The second tuple of (X', 0) includes an entry of the next pointer X' to the data stream, returned by the IndexD process, or comparable process. As there is no cache content corresponding to the pointer X', the value of the corresponding signature is "0."

Turning now to the next continuation token 818b in the sequence, after having received from the server an HTTP header with a first continuation token, the client will issue a new GET request with the same HTTP header value, and including the continuation token, to the server. The server will then evaluate the received continuation token against the sliding window entries. Thus, if the received GET request from the client is for the continuation token that includes the X" pointer, then the server will fetch new set of index records from IndexD. On the other hand, if the receive GET request from the client is for the continuation token that includes the X' pointer, then the server will fetch the signature of cached content from the sliding window. Then, based on signature, cache content is retrieved and returned as response.

More particularly, and with continued reference to the updated continuation token 818b, the content corresponding to "Sig1" has already been returned to the client. Thus, the next set of content to be returned to the client is the content corresponding to "Sig2" and pointed to by the pointer X'. As there is no cache content corresponding to the pointer X", the value of the corresponding signature is "0."

That is, the continuation token 818b has been updated to indicate that the content corresponding to "Sig1" has been sent to the client, and that the content corresponding to "Sig2" and pointed to by the pointer X', should be sent to the client next. Because the server receives the updated continuation token back from the client, the server is thus aware of what content has already been sent to, and received by, the client. That is, the updated continuation token 818b serves as confirmation from the client to the server that the content corresponding to "Sig1" has been received by the client. Correspondingly, the server is made aware of which content should be sent to the client next, that is, the content pointed to by the pointer X'.

As well, a comparison of the continuation token 818b with the continuation token 818a reveals the time adaptive, or sliding, nature of the continuation token window which, in the illustrative example of FIG. 4, is incremented by one pointer in each successive window. To illustrate, in continuation token 818a, the pointer X' does not correspond to any cache content so the value of the corresponding signature is "0," but in the next successive continuation token 818b, the pointer X' points to content corresponding to "Sig2" and a new pointer X" is introduced. However, X" does not correspond to any cache content, the value of the signature corresponding to X" is "0." In the next successive continuation token, 818n, the signature Sig1 has been removed, the pointer X' continues to point to content associated with the signature Sig2, and the pointer X" now points to content associated with the next successive signature Sig3. Finally, the continuation token 818n includes a new pointer X''' which does not correspond to any cache content and, as such, the value of the signature corresponding to X''' is "0."

As will be appreciated, there is no limit to the number of continuation tokens that can be employed in the definition of a particular sliding window. Thus, while the example of FIG. 4 discloses a sliding window of size 3, a sliding window may be larger, or smaller. The sliding window concept is graphically illustrated in FIG. 4 with windows 820a, 820b, and 820c. As shown, the window 820a may embrace or otherwise implicate data sets T1, T2 and T3 of a group of data sets that extends to data set T6. On the other hand, the next successive window 820b no longer involves the data set T1, but has instead 'slid' so that the window 820b embraces data sets T2, T3 and T4. Similarly, the window 820c has slid and, as such, does not concern data sets T1 or T2, but instead is only concerned with data sets T3, T4 and T5.

Thus, the windows 820 increment by a data set each time and, as such, the windows may overlap each other in terms of the data sets with which they are concerned, as indicated. This overlap can help to ensure that the client has received the requested data, and that the server is aware of what data has been received by the client, before a data set is dropped from a window. To illustrate, the data set T3 appears in 3 different windows. In this way, a level of assurance is provided that a consistent state of pagination is established and maintained with respect to one or more data streams passing between a client and a server as the data sets that make up the data stream are provided to the client.

G. Aspects of An Example Sliding Window

Figure 5:
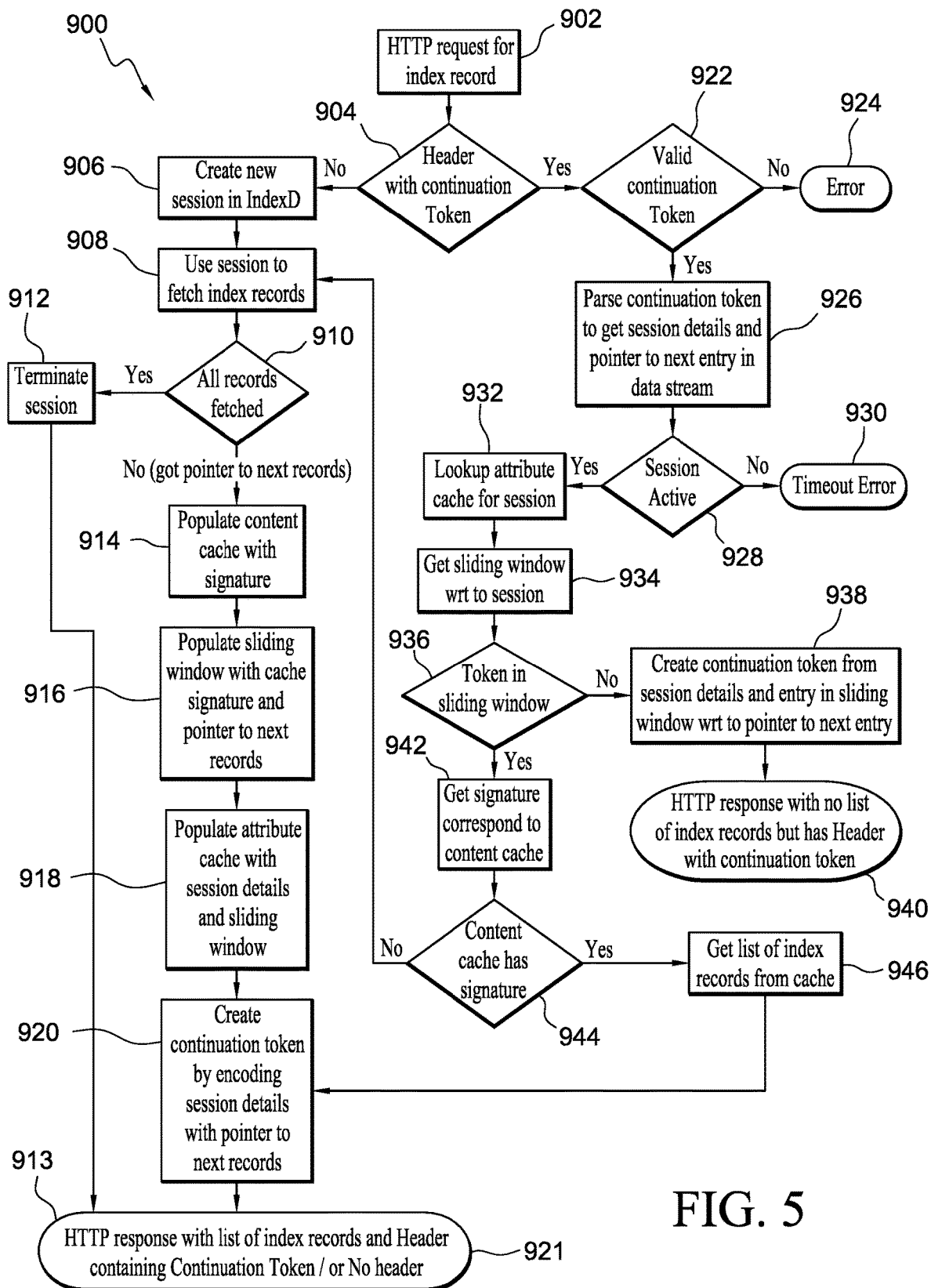
FIG. 5 discloses aspects of an example method for providing pagination of streamed data in a client-server environment.

Turning now to FIG. 5, details are provided concerning methods for implementing and maintaining a consistent pagination state with respect to a data stream passing between a client and server. One example of such a method is denoted generally at 900.

Initially, an application at a client, such as the EMC NetWorker application for example, may generate an HTTP request 902, which may be an idempotent GET request, for one or more index records. The request may be generated 902 in connection with a restore process in which backed up data is to be restored to the client. Depending upon the circumstances, the header of the HTTP request may, or may not, include a continuation token. For example, if the HTTP request is the first request of a restore process, the HTTP request will not include a continuation token. On the other hand, if the HTTP request is other than the initial request of a restore process, the HTTP request will include a continuation token.

In any event, the server receives the HTTP request and examines the HTTP request to determine 904 if the header of the HTTP request includes a continuation token or not. If no continuation token (CT) is present, the server then creates a new session 906 that may be an instance of a record streaming process, such as the IndexD process. The server then uses the session to fetch index records 908 that correspond to the HTTP request 902. The index records may be fetched 908 from an index that resides at the server.

After the index records have been fetched 908, the server performs a check 910 to determine whether or not all the index records requested by the client have been fetched by the server. If so, the method may terminate 912 when the server transmits the remaining index records, but no header, to the requesting client.

However, if there are still index records to be fetched and sent to the client, the server then populates a content cache 914 with a signature that corresponds to the next set of index records to be sent to the client. Next, the server can then populate a sliding window 916 with a tuple comprising the signature and a pointer to the next set of records. As well, the server may populate an attribute cache 918 with session details and sliding window information. The server then creates a continuation token 920 by encoding the session details together with the pointer to the next set of records. An HTTP response that includes the list of next index records and a header including the continuation token is then sent 921 by the server to the client.

With continued reference to FIG. 5, and particularly, the determination 904 as to whether or not the header of the HTTP request from the client includes a continuation token, if the server determines 904 that the HTTP request includes a continuation token, then the server will examine the continuation token 922 to determine if the continuation token is valid or not. If the continuation token is determined by the server to not be valid, an error message will issue 924 from the server to the client. On the other hand, if the server determines 922 that the continuation token is valid, the server then parses 926 the continuation token to obtain the session details and the pointer to the next entry in the data stream.

If the server determines 928 that the session is no longer active, then a timeout error is issued 930 from the server to the client. However, if the server determines 928 that the session is active, then the server looks up the attribute cache 932 for the session. The server can then get the sliding window information 934 that pertains to the session. If the sliding window information is determined 936 not to include a continuation token, then the server creates 938 a continuation token using the session details and using the entry in the sliding window concerning the pointer to the next set of index records. At this point, the server may then transmit 940 an HTTP response to the client that does not include a list of records, but which includes a header with the continuation token that was created 938 earlier.

If, at 936, it is determined by the server that the sliding window includes a continuation token, the server then obtains 942, from the sliding window information, the signature that corresponds to the content cache. Next, if the content cache is determined 944 by the server to have the signature, then the server will obtain the list of index records from the content cache 946, at which point the method 900 then proceeds to 920, discussed above. If the content cache is determined 944 by the server not to have the signature, then the method proceeds to 908, discussed above.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving at a server, from a client, a request for a list of index records that correspond to stored data, wherein the request includes a header;
   when the header is determined to include a valid first continuation token, parsing the first continuation token to obtain information concerning a data streaming session involving the server and the client, and to obtain a pointer to the group of index records;
   when the data streaming session is active, looking up an attribute cache for the data streaming session to obtain sliding window information relating to the data streaming session;
   when the sliding window information includes a second continuation token, obtaining a signature that corresponds to the index records;
   when a content cache includes the signature that corresponds to the index records, obtaining a list of the index records from the content cache; and
   sending a response to the client indicating that the index records in the list of index records have been fetched.

2. The method as recited in claim 1, wherein when it is determined that the data streaming session is inactive, the method further comprises issuing a timeout error by the server.

3. The method as recited in claim 1, wherein when the first continuation token is determined not to be valid, the method further comprises issuing an error message by the server.

4. The method as recited in claim 1, wherein when the sliding window information does not include a second continuation token, the method further comprises:
   creating a second continuation token that comprises a signature that corresponds to the index records, and also comprises a pointer to a next set of index records; and
   transmitting a response to the client, wherein the response includes the second continuation token but does not include a list of the next set of index records.

5. The method as recited in claim 1, wherein when the content cache does not include the signature that corresponds to the index records, the method further comprises fetching the index records.

6. The method as recited in claim 1, wherein the first continuation token indicates to the server that a prior list of index records has been received by the client.

7. The method as recited in claim 1, wherein the first continuation token comprises a tuple that includes a signature that corresponds to data in the content cache, and that also includes the pointer to the group of index records.

8. The method as recited in claim 7, wherein the signature uniquely identifies the corresponding data in the content cache.

9. The method as recited in claim 7, wherein content of the sliding window changes as each successive list of records is transmitted to the client.

10. A system, comprising:
    one or more hardware processors; and
    a non-transitory storage medium storing instructions that are executable by the one or more hardware processors to perform operations comprising:
       receiving at a server, from a client, a request for a list of index records that correspond to stored data, wherein the request includes a header;
       when the header is determined to include a valid first continuation token, parsing the first continuation token to obtain information concerning a data streaming session involving the server and the client, and to obtain a pointer to the group of index records;
       when the data streaming session is active, looking up an attribute cache for the data streaming session to obtain sliding window information relating to the data streaming session;
       when the sliding window information includes a second continuation token, obtaining a signature that corresponds to the index records;
       when a content cache includes the signature that corresponds to the index records, obtaining a list of the index records from the content cache; and
       sending a response to the client indicating that the index records in the list of index records have been fetched.

11. The system as recited in claim 1, wherein when it is determined that the data streaming session is inactive, the operations further comprise issuing a timeout error by the server.

12. The system as recited in claim 1, wherein when the first continuation token is determined not to be valid, the operations further comprise issuing an error message by the server.

13. The system as recited in claim 1, wherein when the sliding window information does not include a second continuation token, the operations further comprise:
    creating a second continuation token that comprises a signature that corresponds to the index records, and also comprises a pointer to a next set of index records; and
    transmitting a response to the client, wherein the response includes the second continuation token but does not include a list of the next set of index records.

14. The system as recited in claim 1, wherein when the content cache does not include the signature that corresponds to the index records, the operations further comprise fetching the index records.

15. The system as recited in claim 1, wherein the first continuation token indicates to the server that a prior list of index records has been received by the client.

16. The system as recited in claim 1, wherein the first continuation token comprises a tuple that includes a signature that corresponds to data in the content cache, and that also includes the pointer to the group of index records.

17. The system as recited in claim 16, wherein the signature uniquely identifies the corresponding data in the content cache.

18. The system as recited in claim 16, wherein content of the sliding window changes as each successive list of records is transmitted to the client.

* * * * *